United States Patent [19]

Catlin

[11] Patent Number: 5,363,939

[45] Date of Patent: Nov. 15, 1994

[54] SAFE, LOW EMISSIONS, LOW COST, AUTOMOBILE

[75] Inventor: Christopher S. Catlin, Beverly Hills, Calif.

[73] Assignee: Xcorp, Inc., Beverly Hills, Calif.

[21] Appl. No.: 979,309

[22] Filed: Nov. 20, 1992

[51] Int. Cl.$^5$ .............................. B60K 5/00
[52] U.S. Cl. ................... 180/291; 180/903; 180/297; 296/188; 296/203
[58] Field of Search ............ 296/185, 197, 203, 187, 296/188; 244/133, 158 A; 180/903, 291, 297; 280/751, 796; 293/133

[56] References Cited

U.S. PATENT DOCUMENTS

| | | |
|---|---|---|
| 3,550,948 | 12/1970 | Thompson, Jr. ................. 296/185 |
| 3,888,502 | 6/1975 | Felzer et al. .................... 293/133 |
| 4,369,217 | 1/1983 | Leistritz ........................ 280/796 |

Primary Examiner—Richard M. Camby
Attorney, Agent, or Firm—Ladas & Parry

[57] ABSTRACT

An ultra safe, low cost, ultra-low emissions automobile providing high survivability in case of an accident, the automobile having a cold molded engineered ceramic monocoque inner chassis body, and a stylized outer body encasing the inner body, the outer body being attached to the inner body. The automobile is constructed such that the inner chassis body is made up of at least two separately molded parts, and the two molded parts are joined together by self-aligning pin and hole combinations, each such combination including a pin projecting from one of the molded parts and a mating hole on the adjacent molded part. The molded parts of the inner body and each pin and mating hole combination are secured together by super glue. The inner body is shaped to accommodate a cockpit module, has a forward nose cell, and comprises a mass of structural plastic foam within the nose cell forming a collision bulkhead. The cockpit module has all of the desirable interior appointments fitted into an opening of prescribed dimensions provided in the inner monocoque body.

4 Claims, 6 Drawing Sheets

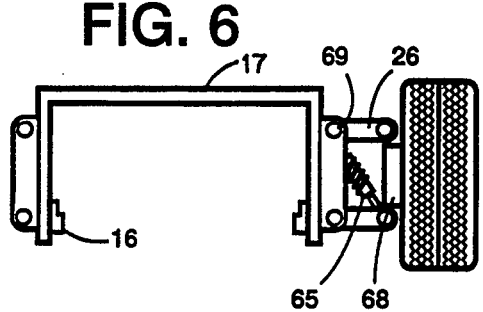
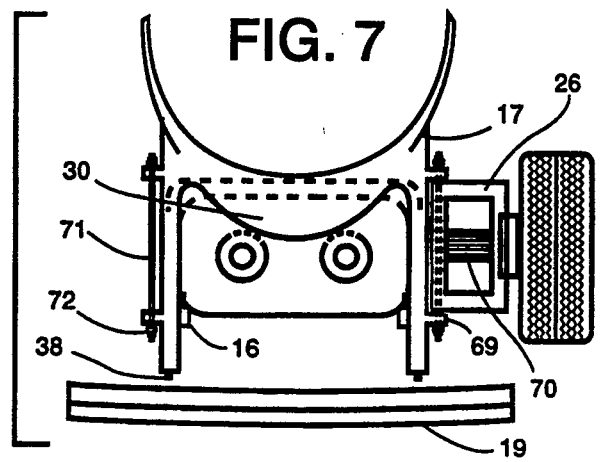
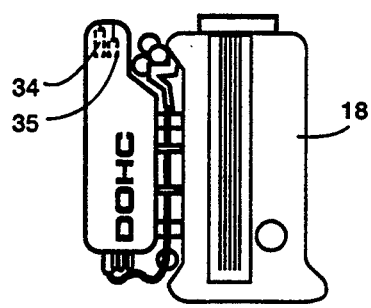
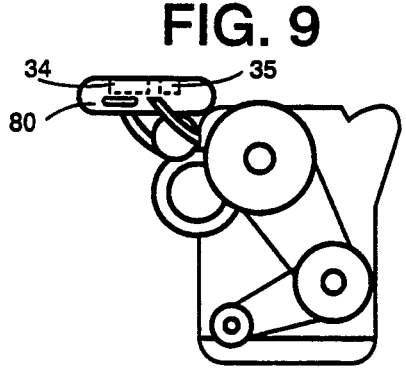
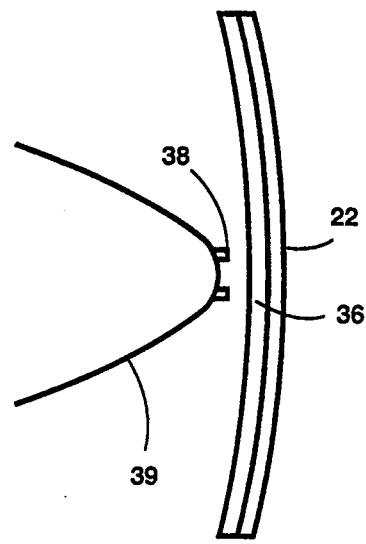
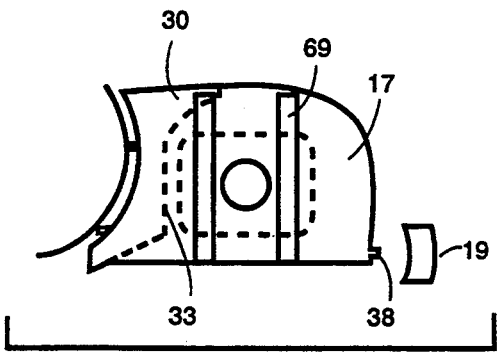

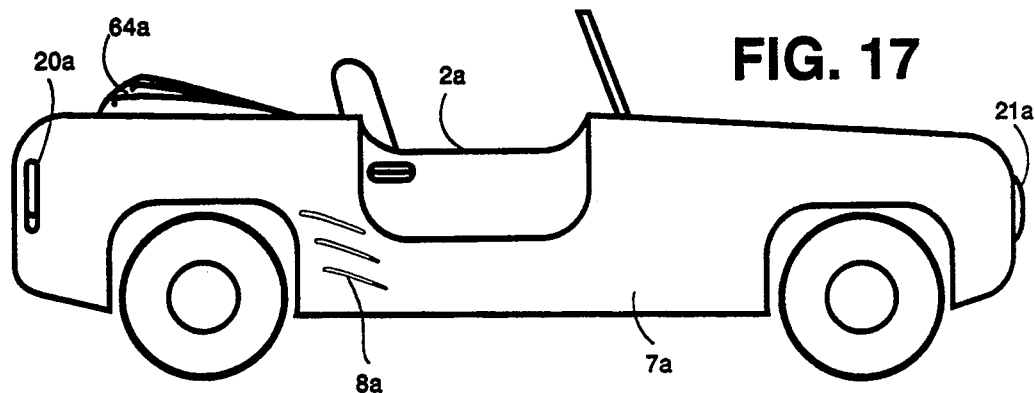
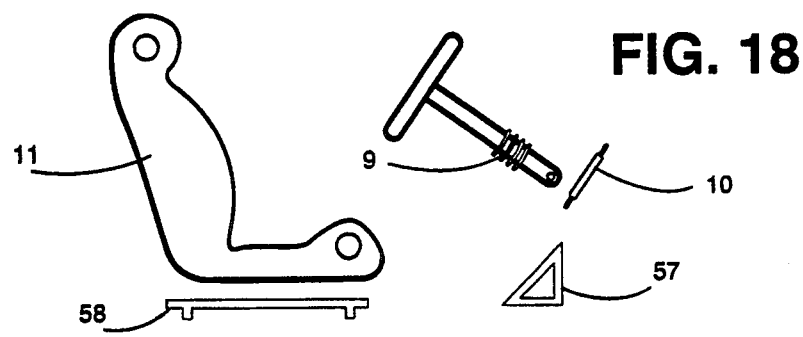
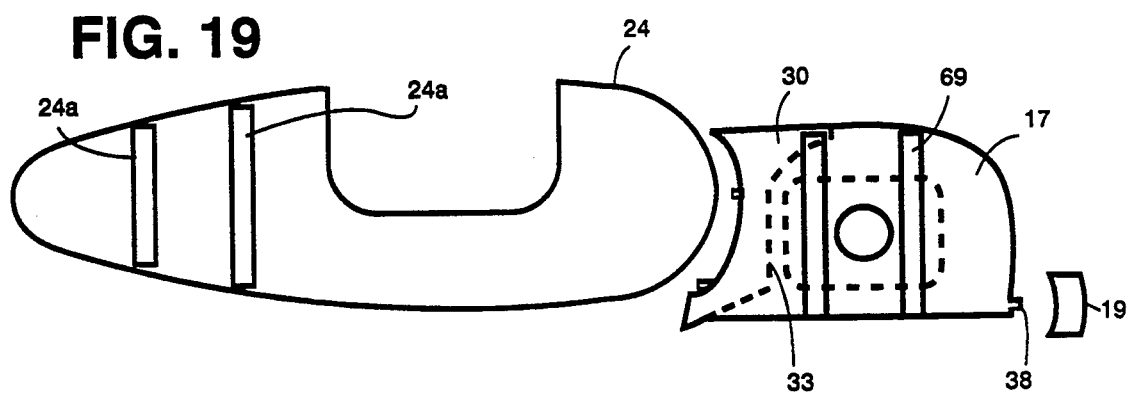

SAFE, LOW EMISSIONS, LOW COST, AUTOMOBILE

BACKGROUND OF THE INVENTION

1. Field of the Invention

This invention relates to the field of automobiles, and more particularly to an automobile that is inexpensive to produce, has a high crash-worthiness, expends low emissions in operation, results in low waste production in its manufacture, and offers dramatic improvement in ease of use and maintenance.

2. Brief Description of the Prior Art

The automobiles market is enormous, there being approximately 540 million cars and trucks in the world, 123 million cars, 4.4 million motorcycles operating in the United States alone. Ten million cars are sold in the U.S. per year, 1 million subcompacts, 1 million motorcycles, and 400,000 all-terrain vehicles. Additionally, another 10 million used cars were sold last year. Of the 42 million U.S. households, 50% have two or more cars, and the owners do a considerable amount of commuting and running of errands. In the U.S., the average round trip daily commute is about 22 miles. For this type of vehicular travel, the public has often resorted to the use of economy subcompacts, motorcycles, and scooters as second vehicles to fulfill the need.

Approximately 108 million Americans drive to work, up more than one third from just a decade ago. Two thirds of all population growth has taken place in the suburbs requiring extra driving distances. Women make up almost half the workforce and drive 50% more than they did in 1983.

The automobile has come to its outer limits as we know it. Many of the major problems that are facing the world can be traced directly back to its manufacture and use, including the massive pollution of air, land, and water by the enormous industrial machines it requires to be manufactured, its own direct poisoning of the atmosphere from its use and disposal, and the millions of people that are killed and injured attributable to its use. On the one hand, the automobile is an essential link in modern civilization, but at the same time a major contribution to its growing problems. Then again, the modern automobile is essentially the same as it was when it was invented with only minor design differences.

There have been some improvements since the concept of the automobile, however. Ford mass-produced the automobile making it affordable to the masses. Mercedes created a well-engineered car, and the Japanese created an affordable well-engineered car with substantially zero defects and capable of rapid improvements. But today's automobile is still essentially the same machine.

Several factors have motivated the inventor to depart from the rather standard automobile structure and manufacture techniques, and the resultant design is the basis for the present invention.

One of these factors is safety. The U.S. fatality deaths per 100 million miles was 7.5 in 1950 and was 2.0 in 1989. The U.S. is second only to Sweden as the safest driving country. There is good reason to believe that this improved fatality rate can be even lower.

Another factor is the use of more plastics in automobiles. The average car's plastic content has more than doubled since 1972. Plastic bumper covers, interior panels, trim moldings, bumper beams, fuel tanks, valve covers, and oil pans are commonly used today.

Another factor is the size and weight of the automobiles. Big cars on the road made up 51% of the automobile fleet in 1977 and 39% in 1990. Curb weight of the average American car was 4500 pounds in 1972, and has dropped to 3200 pounds in 1990.

Yet another factor is cost. Cars have become very expensive. The average new car price tag is $12,500.00, and with interest on payments and insurance at about $1200.00 per year, there has been an increased demand for low cost automobiles. Cars scrapped as percent of those on the road was 9% in 1971, and in 1991, it was 6.5%. Average age of cars on the road in 1971 was 5.5 years, and in 1991 it was 8 years. All of the above statistical factors, except for cost, have been steadily improving over the years. However, there would appear to be a clear need for a major redesign of the modern automobile and its construction in order to realize a step-wise improvement in these factors, including lowering the price of automobiles. It is the object of the present invention to fulfill that need.

Some of the design concepts, materials, and assembly techniques to be discussed in this specification have, at least to some extent been explored in the prior art.

In the helicopter industry, the utilization of advanced composites at the production stage permits the construction of a high efficiency machine capable of performances unthinkable a few years ago. Conventional structures contain low cost materials which require increasingly expensive manufacturing procedures. On the other hand, composites are more expensive, but permit the adoption of automatic manufacturing procedures with a net economic gain of approximately 30–50%. The introduction of advanced composites has allowed the reliability and ease of maintenance of the machines to increase because the number of included components, and hence the probability of breakdown and malfunction risk, have been drastically reduced. The payload at equal power is increased as a direct consequence of the lighter structure. Finally, the overall utilization cost of the helicopter has decreased, because of the decrease in the original purchase price and lower operating cost.

In recent years, composite materials have been very successfully applied to racing car chassis by employing methods which replace more traditional production methods utilizing riveted steel sheets. The advantages from an engineering point of view can be quantified in terms of increased mass specific torsional and bending stiffness, improvements in crash-worthiness, ease of repair and reuse, and structural stability over time. Also, a stable mold gives reproducible dimensional accuracy on chassis production runs. Tooling cost comparisons show molding equipment to be significantly less than steel presses.

Structural ceramics and ceramic composites, known in the industry as "engineered ceramics" as well as "Advanced Engineering Ceramics" (AEC), are being used in a wide variety of automotive applications requiring high strength. Silicon carbide fibers have been added to increase strength of silicon nitride and alumina automotive components such as piston heads, bearings, turbo rotors, engine valves, engine blocks and valve seats.

Engineered ceramic materials have many uses. However, engineered ceramics have heretofore not been used in the manufacture of automobile chassis, although similar materials already exist in nature, dental enamel, bones, and sea shells, being examples. Engineered ceramics can be formed at room temperature. That is, it can be "cold molded".

One of the many virtues of ceramics is their ability to withstand service temperatures up to 1,650° C.

Ceramics tend to be weak in tension, but strong in compression. In metals, compression strength is near the tensile strength, but compressive strength may be ten times the tensile strength in a ceramic. The discrepancy between tensile and compressive strengths is in part due to the brittle natures of ceramics. In tension, ceramics, unlike metals, are unable to yield and relieve the stress. This weakness is solved by the design of the chassis of the present invention, utilizing a compound curve egg-shaped mold which is one of the strongest shapes known. The use of engineered ceramics also addresses this problem. Single-ceramics usually are stronger than those with more than one phase. Machining can introduce flaws in a part. Sintering to final shape as is done in the present invention not only saves time and labor, it produces a stronger part.

Glass fiber materials are very strong in tension, with tensile strengths up to 4,300 MPa ($624 \times 10^3$) psi compared to only 400 MPa ($58 \times 10^3$) psi for ordinary steel. Glass fiber can reinforce ceramic-matrix composites.

There are many engineering ceramics applicable for use in producing the present invention: hot pressed and sintered carbides such as beryllium carbide, titanium carbide, columbian carbide, tantalum carbide and zirconium carbide; silicon carbides such as silicon bonded, silicon nitride bonded, KT SIC, boron carbide; and reaction bonded and hot pressed silicon nitrides. High-alumina ceramics and carbides with metal binders are also applicable.

Dow Chemical produces silicon ceramic molds along with fifty others situated in the US, Japan, Canada and Europe. They produce primarily for the automotive, aerospace, computer and high tech industries.

The race car industry has made use of a body design known as monocoque, i.e. a type of construction in which the outer skin carries all or a major part of the stresses. It is a type of vehicle construction in which the body is integral with the chassis. A number of different materials have been proposed for monocoque chassis. Gel casting is a process in which a slurry of ceramic powder (silicon nitride) in a solution of organic monomers is cast in a mold. The mixture is polymerized in situ to form jelled parts in complex shapes which overcome some of the major drawbacks of injection molding. Other applicable formulas are: organo metallic derived ceramics, silicon carbide ceramics, carbon fiber reinforced plastics, thermoplastic resin composition made of glass balloons, and reinforcing fiber in thermoplastic resin. Also, silicon nitride whose properties include excellent high temperature strength, wear resistance, and light weight have been used in the production of components such as turbo charger rotors, rocker arm tips, and ball bearings, all commercially produced to exhibit high strength and reliability. Another formula is phenolic resins which have been employed in the body and turbine components of water pumps, carburetors, injection pumps, and some parts of the automatic transmission of an automobile. Its ability to achieve high loading have allowed the possibility to replace aluminum components in automobiles. Organic polymers of thermosetting and thermoplastics applications have been used in spacecraft nose cones, internal protective covers for rocket engine exhaust systems, and construction for combustion engines.

Several publications relating to engineered ceramic materials are available as reference materials. All of the following documents are of interest in this field and all are incorporated herein by reference for purposes of indicating the background of the invention and illustrating the state of the art relative to the use of engineered ceramic materials:

"Gelcasting of Alumina" by Albert C. Young, Ogbemi O. Omatete, Mark A. Janney, and Paul A. Menchhofer, *Journal of the American Ceramic Society*, Vol. 74, No. 3, March 1991, Pages 612-618;

"Gelcasting—A New Ceramic Forming Process" by Ogbemi O. Omatete, Mark A. Janney, and Richard A. Strehlow, *American Ceramic Society Bulletin*, Vol. 70, No. 10, 1991;

"Guide to Engineered Materials", *Advanced Materials & Processes/incorporating Metal Progress*, Pages 30-49.

Catalog of WESGO Technical Ceramics and Brazing Alloys, 477 Harbor Boulevard, Belmont, Calif. 94002; and Catalog of CERCOM Inc., 1960 Watson Way, Vista, Calif. 92083.

Adhesives have been used to bond aircraft components made of plastics, high temperature metal, or polymer matrix composites, including acrylic, bismalaimide, cyanoacrylate, epoxy, phenolic, polyimides, silicone, and urethane. A beneficial side effect of this type of bonding has been to baffle or suppress engine noise.

BRIEF SUMMARY OF THE INVENTION

The present invention relates to a motor vehicle machine of a design where investment and production costs are reduced due to fewer parts, fewer operations, less material, and reduced capital equipment, tooling, labor, and floor space required to build it. The design creates a virtually indestructible rollcage around the passengers and is structured to divert the vehicle away from impact. The design significantly reduces pollution during construction and during use and helps in recycling at the end of the automobile's product cycle. It is a marked advancement in automobile technology.

The invention is the next generation of motor vehicle, for the first time combining all of the previous generation's accomplishments with the best technology developed and proven in the aerospace and computer fields, utilizing the already well developed automobile parts industry, and current automobile management and financial assets to create the next generation vehicle offering superior safety, ultra low emissions and an lower price than possible using already known technology.

One of the trends building in the industry is that of adaptive design. The Japanese are able to come out with many more models per year using this scheme. Several body styles will be offered on the same chassis of the present invention; a very rounded Porsche-like roadster shape, a more conservative Mercedes 500SL-like shape, and the squared off Jeep shape. Personalizing individualized bodies, cockpit, engine, color, and trim is planned. Concepts for follow-on next generation products include a larger four passenger chassis, a DMW sedan sized version, a single seat version, and a van. Both front-engine and rear-engine constructions can be produced without major modification.

The most important attribute of the invention is low cost. By eliminating all welding, most converting, and almost all fitting by using self-aligning parts, the invention cuts normally high industry average labor costs down to a minimum.

To aid in keeping cost low, raw/prefabricated materials, components, and sub-assemblies required for production are jobbed out, and maximum use of off-the-shelf parts are utilized. The manufacturing process is basically a low-tech converting process requiring minimal equipment such as simple building jigs, hydraulic ratchets and glue guns.

In accordance with one aspect of the invention, there is provided an ultra safe, low cost, ultra-low emissions automobile providing high survivability in case of an accident, the automobile comprising a cold molded engineered ceramic monocoque inner chassis body, a molded thin-walled cockpit module, a stylized outer body encasing the inner body, and means for attaching the outer body to the inner body. The cockpit module and outer body are preferably made of ABS (Acrylonitrile-Butadiene-Styrene). Other choices for the cockpit module are poly-carbon and Cycolac. The preferred engineered ceramic for forming the inner chassis is what may be referred to as organoceramic. The term "organoceramic" refers to a material in which threads of polymer are trapped within the crystalline structure of a ceramic making it less likely to crack under pressure and allowing the ceramic to exhibit better absorption of stress. The material is formed at room temperature, thereby falling into the category of cold molded engineered ceramic articles. The organoceramic material contemplated for use as the material making up the chassis 24 of the present invention is the subject of a paper by Dr. Stupp which is not yet published. Dr. Stupp has, however, as of the filing of the present application for patent, filed a paper on organoapatite which has similar characteristics.

The automobile is advantageously constructed such that the inner chassis body is comprised of at least two separately molded parts, and the two molded parts are joined together by self-aligning pin and hole combinations, each such combination comprising a pin projecting from one of the molded parts and a mating hole on the adjacent molded part.

The molded parts of the inner body and each pin and mating hole combination may be secured together by super glue.

The inner body is shaped to accommodate a cockpit module, has a forward nose cell, and comprises a mass of structural plastic foam within the nose cell forming a collision bulkhead.

The cockpit module having all desirable interior appointments, is fitted into an opening of prescribed dimensions provided in the inner monocoque body.

The automobile according to the invention is more efficiently produced than prior art automobiles due to simplicity of design, reduced manufacturing costs, energy savings, and leaner management. The invention is also of better quality due to the simplicity of design. All parts may be subcontracted, so minimal tooling is required for production. Quality control will assure that warranty costs will be minimal.

With its very flexible production format, the automobile can be customized at practically no added cost, offering different interiors, trim, and accessories. With the low initial investment in a suitable manufacturing plant, and low and flexible labor components, profit can be made at very low volumes.

The automobile is designed to be built in regional minifactories. It is designed for many parts/engine combinations using local components, using local labor, and off-the-shelf parts utilizing state of the art inventory concepts and a highly computerized management.

As to the minifactory concept, localized sites reduce cost and ties in with on-premises showroom and service. Local manpower and local startup costs may be utilized which maximizes incentives from local and state governments.

It normally takes production runs of 50,000 conventionally built cars to make a profit. The automobile of this invention is designed to be built with a minimum of investment and labor based on a much lower break-even point, allowing it to make a profit much earlier in its start-up.

According to a MIT study, the Japanese take 16.8 hours on average to produce a car, the Americans require 25 hours, and the Europeans need 36 hours. As to production development time, the Japanese can design, develop and deliver an entirely new car in 46 months using an average 1.7 million hours of engineering effort. The Europeans and Americans take 60 months and 3 million engineering hours. This means the product life cycles are shortening, which puts pressure on smaller, regional producers who come to the market with fewer new models and older designs. The bottom line is the Japanese can achieve more product variety at a lower cost. The automobile of the present invention thus becomes a major technological advancement, as it requires only 8 manhours of direct labor for assembly.

The concept underlying the invention is to build cars modularly, like computers. The manufacturing plant will only be geared to assembly, all parts being jobbed out to suppliers. Inventory and overhead costs will be kept low, absorbed primarily by suppliers. Ultra low labor costs result from the low tech manufacturing process in regional minifactories. This creates "light" overhead in factory, equipment, debt service, management costs and labor in the long term (health and retirement factors). Because the manufacturing process is as important in the final design of the product as all other aspects, the total manufacturing costs can be kept very low relative to the industry average.

The smaller size and weight of the automobile allows much lower transportation costs. This, in turn, reduces shipping time and increases customer satisfaction.

For the consumer, the invention will result in lower initial costs and lower operating costs compared to the average current subcompact automobile. Fewer rejects or breakdowns due to the simplicity of design and construction will result in lower service and warranty costs. Being lightweight, of modular construction, and employing many safety features, the automobile will result in better gas mileage, reduced insurance, lower maintenance, and less tire wear.

The critical variable in crashworthiness is design. By using an egg-shaped monocoque hull of compound curves as the inner structural chassis body, maximum strength of the automobile is achieved and surrounds the driver in a 3-dimensional safety cage. Formula One and aircraft accidents have undeniably proven the strength of the monocoque design. Most head-on collisions (the most dangerous of accidents) are usually off-center hits which miss the engine entirely, and plow into the driving compartment. The streamlined monocoque hull reduces this threat. Only a few standard automobile passenger areas survive the standard government test of 35 MPH into a static wall, and they require at least two feet of specially designed collapsible steel construction. A small lightweight car cannot have such attributes, yet the monocoque design provides the desirable protection.

Other safety features are the invention's ability to accelerate, due to the high power-to-weight ratio, (similar to a Volkswagen GTI), allowing users to maneuver out of trouble. The cockpit is designed to reduce the driver's impact with four point safety belts that are easy to cinch up, and there is no dashboard to injure the passenger's legs. A collapsible tube steering column and flat control buttons on the steering wheel are additional safety features. Airbags, an integrated rollbar/windshield, bullet-proof lexan windshield, four wheel disk brakes, better interior padding, and greater visibility, all offer additional improved safety for the driver.

There is more to pollution than simply emissions. Oil, energy use, chassis disposal, and other pollution is created during production. The current automobile industry is based on heavy metal working machinery and labor/robot intensive construction technology.

Much of the average car is constructed of recycled iron, steel, and aluminum. The lead plates inside the batteries, the battery housings, and sulfuric acid are reprocessed, as is oil, coolants, and refrigerants. Waste textiles are shredded to produce sound insulation. Thermoplastic remnants from production lines are mixed with reclaimed scrap material, melted down, and used to form trunk linings, spare tire covers, and ventilation ducts.

In recycling cars, steel and aluminum consume much greater amounts of energy to produce and recycle than plastics. The increasing complexity of new cars makes this disassembly and reprocessing more expensive than the recycle process.

Though currently recycling the ABS outer body and rigid ceramic plastic hull may be difficult (thermoplastic and thermoset plastics do not mix well, especially with paint and flame retardants), bar coding pieces of plastic to identify their specific plastic composition will be very useful for future recycling, as will the use of naturally based glues with lignin and tanins, and natural polymers derived from the core and bark of trees to replace petroleum based adhesives.

Electric vehicles may sound attractive at first blush, but actually when all is considered, they are much less efficient due to hidden inefficiencies. Adding the 50% conversion loss of fuel to electricity at the power station plus the 20% loss in the long high power transmission lines, the loss in the batteries, and the loss in carrying the extra large weight of the batteries, this form of energy for automobiles is not as attractive as first thought. Additionally, the buyer is confronted with added initial costs and tooling costs, and the battery and residual hydrogen gas in the event of an accident is a serious safety consideration. Also, disposing of the massive batteries adds to the pollution problem. When all is considered, electric vehicles are inefficient, suffer limited range, are very expensive, and have severe recycling problems. Additionally, there are expensive replacement costs of the batteries which have short life cycles of 2-4 years. Also, there is the consideration of added gear noise and delayed reaction accelerator feel (drive-by-wire characteristics that may take time getting used to). The current state of the art for electric vehicles has produced very expensive cars with limited mileage, poor performance, and survivability.

Hybrid drive vehicles using a small gasoline engine driving a larger alternator to charge a battery pack have also been proposed. The vehicle can be run either in the hybrid gas-electric mode or as a pure electric vehicle when necessary. Volkswagen and others have spent heavily on research in this area, but the design has doubled the number of mechanical components, with the associated elevated cost, maintenance, and weight.

The small gas engine is the best alternative, and the only way to make it efficient is to use it in combination with a lightweight vehicle resulting in ultra-low emissions. Such a vehicle will be very attractive in meeting new state, national, and international emissions standards.

The automobile of the present invention: is smaller than the average vehicle to reduce traffic congestion; is a two-seater vehicle weighing less to conserve resources and to produce fewer noxious emissions; permits the use of more safety features; and contains additional recyclable parts. Lastly, the invention offers dramatic improvement in ease of use and maintenance with its ability to accommodate a CVT (continuously variable transmission), allowing a two pedal operation, ease of handling due to its lightweight, ease of parking due to its size and weight, and ease of controls all built into the steering wheel. Heretofore, automobiles which were designed as small two-seater cars produced excellent fuel consumption figures, but in doing so created poor performance, loss of crashworthiness and did not result in significant cost savings. Past models such as: Minimoke, Morgan tri-wheeler, Nash Metropolitan, Vespa 400, Meshersmitt 500, Zundapp Tri-wheeler, Austin-Healy Sprite, Mini-Cooper 850, Lotus Super 7, and present models such as Daihatsu Charade, Geo Metro, Suzuki Swift, Honda CRX, Citroen AX, all suffer the same limitations. Even future prototypes such as Ford Zig, Fiat Cinquecento 500, VSP, Honda Beat, Toyota AXV, Diahatsu X-021, BMW E1, VW Chico, and Ford Contour have not resolved these problems.

On the other hand, the present invention provides an automobile that is very low in cost to produce, has high crashworthiness in case of an accident, is ultra-low in emissions, results in low waste production in construction, and has improved ease of use.

BRIEF DESCRIPTION OF THE DRAWING

Further objects and advantages of the invention will become apparent by reference to the following description having reference to the drawings in which:

FIG. 6 is a rear elevational schematic view of the rear wheel suspension connection;

FIG. 7 is a top view of the universal engine mount/wing assembly;

FIG. 8 is a top view of the engine:

FIG. 9 is a front view of the engine;

FIG. 10 is a top view of the front bumper attachment to the inner chassis body;

FIG. 11 is a side elevation view of the universal engine mount/wing assembly;

FIG. 17 shows an outer body style that can be fitted over the inner body chassis to produce a front-wheel-drive automobile;

FIG. 18 schematically illustrates the relative placement of functional components contained within the cockpit module employed in the outer body style of FIG. 17; and FIG. 19 is a side elevation view of the inner body chassis, motor mount, and outer body support members for the outer body style of FIG. 5 or FIG. 17.

DETAILED DESCRIPTION OF THE PREFERRED EMBODIMENTS

Figure 1:
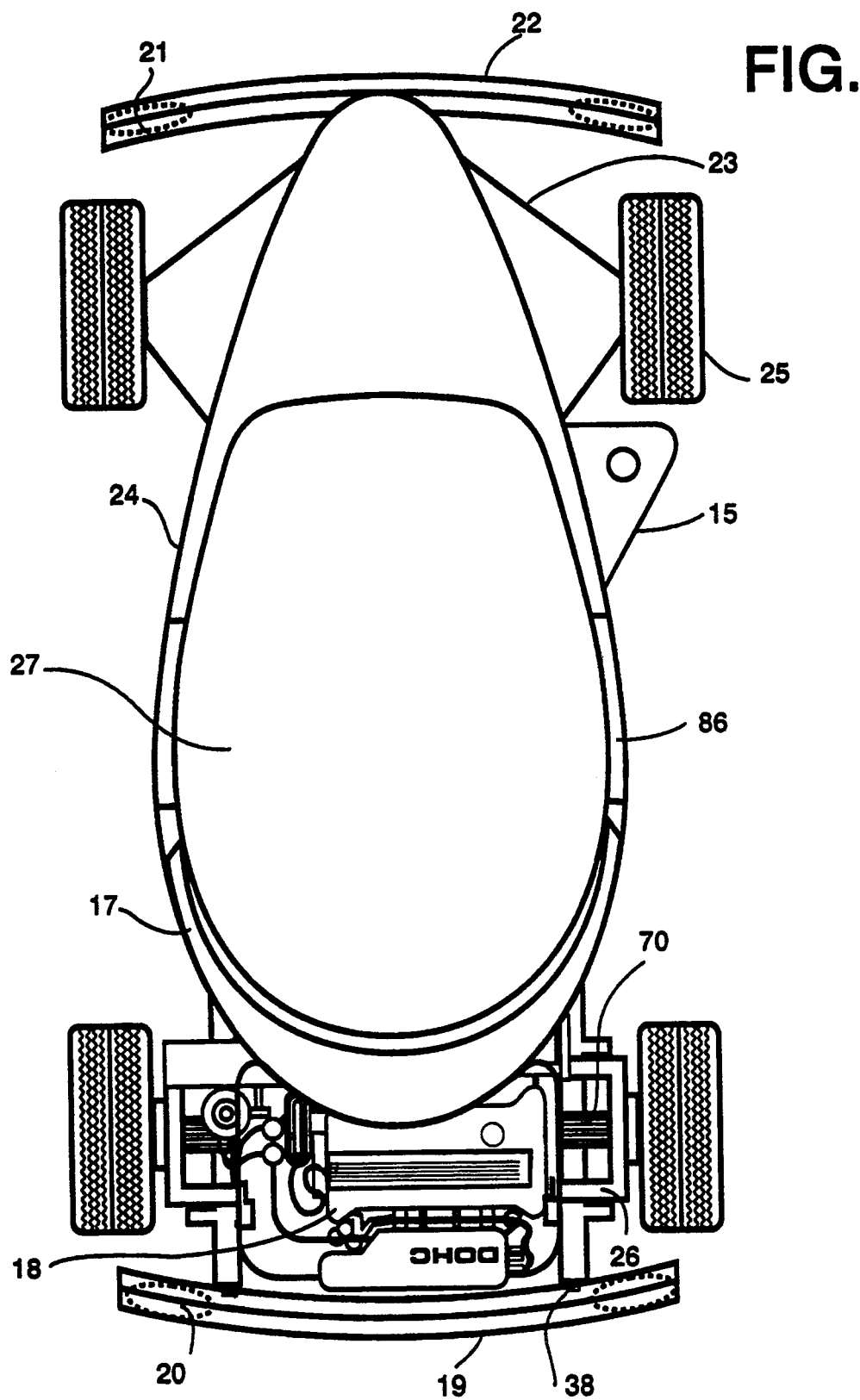
FIG. 1 is a top view of the inner chassis of the automobile in accordance with the invention, i.e. with the outer body removed.

Referring to FIG. 1, the automobile of the present invention is constructed by assembling modules including a single-piece ABS cockpit mold 27, an encompassing two-piece injection molded engineered ceramic chassis 24, front ceramic suspension wishbones 23, a front bumper 22 with embedded front combination lights 21, wheels and tires 25, a gas tank 15, molded-in door frames 16, a rear bumper 19 with embedded rear combination lights 20, an engine/transaxle assembly 18 mounted to an engine mount/wing 17, and a drive shaft 70 for driving the rear wheels 25. All components of the vehicle, including those just mentioned and those yet to be described are designed to snap into place primarily by means of wide stubby connecting pins 38 molded in place in one of the parts to be connected and fit into mating holes in the other part, the two parts being held together by the application of super glue (ethyl cyanoacrylate), between the pins and the walls of the holes as well as any touching faces of the two parts to be joined. The pins are preferably about 1" in diameter and ½" tall, providing a large surface area for strength and making the parts easier to mold.

As opposed to molding projecting pins on one of the parts to be joined, all parts can, if desired, be formed with holes, and the pins can be later set in position in one of the parts (with glue) and subsequently fit into the other part (with glue), the ends of the pins being preferably tapered so as to be self-aligning in the event that the parts to be joined are not perfectly aligned in the first instance. In this type of construction and assembly, the pins are preferably about 1" in length.

Figure 2:
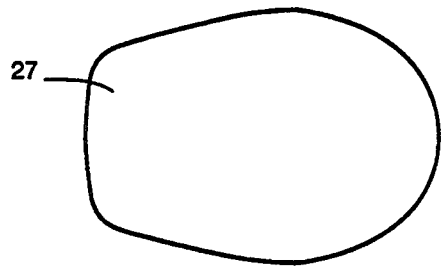
FIG. 2 is a simplified drawing of the two parts comprising the cockpit module.

As seen in FIG. 2, the passenger cockpit mold 27 is of molded single-piece poly-carbon, ABS, or Cycolac construction with fine detail, ribbing, etc. (not shown) molded in. It has no dashboard and is of a generally oval shape. The passenger cockpit may include armrests, padding for safety, and decorative or ornamental accessories presenting a pleasant environment for the driver/passenger.

Figure 3:
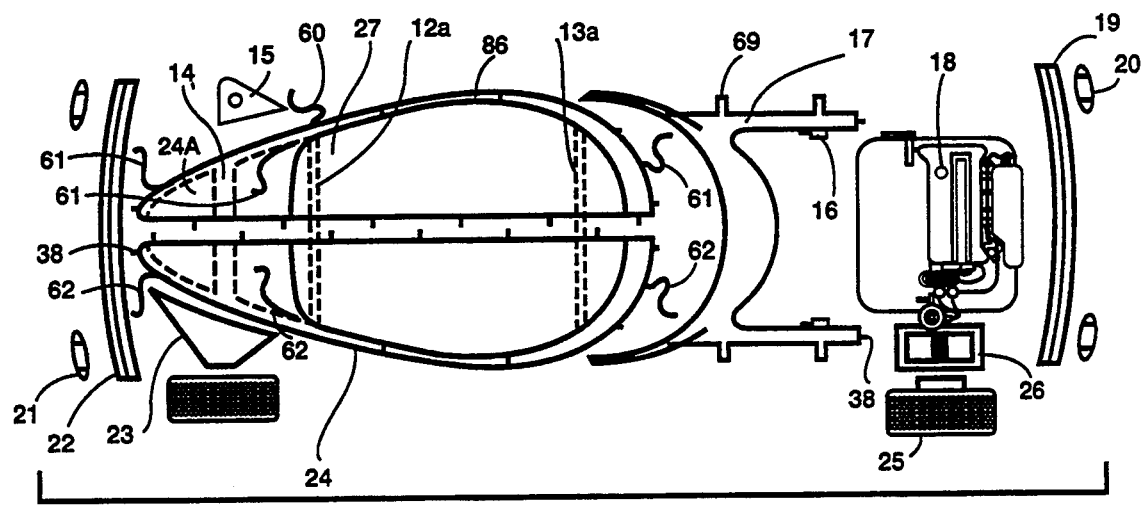
FIG. 3 is an exploded view of the components making up the inner body chassis and shows motor and wheel connections.

FIG. 3 shows an exploded view of the modular components making up the inner body chassis of the automobile. Sized to surround the cockpit mold 27 is a two-piece injection molded engineered ceramic chassis 24, having its two parts connected by pin/hole combinations with appropriate bonding.

Figure 3A:
FIG. 3A illustrates a plastic mold insert for the nose of the inner body chassis.

The strength of the engineered ceramic material permits the chassis 24 to have a thickness of only 1.25 cm at the sides, 2.50 cm at the front, and 1.75 cm at the rear. In molding the chassis 24, a molded-in front bulkhead 14 is created. Assembly of the two pieces of the chassis 24, creates a nose cavity 24A within which a plastic mold insert 28 (FIG. 3A) is inserted. The insert 28 is formed of structural plastic foam (ROHACELL produced by Daisel Corp.) forming a collision bulkhead. The specific plastic foam was chosen because of its lightness, mechanical strength, and ease to form.

Figure 3B:
FIGS. 3B and 3C show, respectively, front and rear body supports used in attaching the outer body to the inner chassis of the automobile.
Figure 3C:
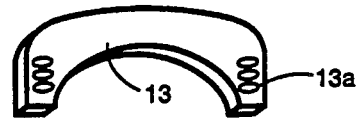

Forward and rear body supports 12 and 13, which vary with the type of body selected, are shown in FIGS. 3B and 3C, respectively. These supports, made of engineered ceramic, are positioned as shown by the dashed lines 12a and 13a in FIG. 3, in the final assembled automobile inner body. Stubby connecting pins 38 (not shown for this connection) may protrude through aligned apertures (not shown) in the cockpit module 27 so that glued connecting pins 38 may join the lateral sides of each body support 12, 13 with the outer body 7 (FIGS. 5 and 17) with the cockpit sandwiched between. Alternatively, the cockpit module 27 may simply be glued in place to mating receiving surfaces molded into the inner chassis 24.

The steering column 9 (FIG. 4) passes through opening 56 in the forward body support 12. The ABS body 7 is fitted over and bolted to front and rear bumpers 22 and 19 with self-locking nylon nuts, as well as to body supports 12 and 13, the latter having ventilation holes 13a that align with engine ducts 8 (FIG. 5).

The front combination high density discharge (HID) headlamp systems 21, including headlight, parking, and turn signal lights, are fitted into molded-in alignment bays in the curved bumper extrusion 22. The bumper 22 itself, which may be aluminum or ceramic, is fitted and glued to self-alignment snap-in pins 38, molded into the front of chassis 24. The combination headlights 21 are connected to the electrical harness 61 in a conventional manner.

Front bumper 22 is mounted near the center of the bumper, again with pin/hole/glue fastening. While the strength of the connection is sufficient for normal use of the vehicle, upon collision the bumper will collapse (pivot) to the left of right (depending upon the side or the collision), and, being of curved construction, will pivot relative to the inner chassis body, so as to drive the vehicle away from the object with which the vehicle has collided or steer the mass away from the crash.

The six-gallon ceramic molded fuel tank 15 is snap-fitted to pins molded into the right side of chassis 24 behind the front wheels. The tank 15 is connected to molded-in fuel line 60.

The universal engine mount/wing 17 is fitted and glued to chassis 24 using pin-hole combinations. The inline DOHC 2-valve per cycle air cooled 600 cc engine 18 (FIG. 8) is bolted to the universal engine mount/wing 17, supported by spacers 16, and connected to the serviceable hydraulic harness 62, electrical harness 61, and fuel line 60. The engine preferably is a 2 cycle 600 cc engine with a compression ratio of 9.2:1 with HP @ rpm SAE net 40 and torque lb-ft @ rpm SAE net 70 @

4200). The transmission is preferably a TOROTEK gearbox (Torotek, Ltd., England) CVT (continuously variable transmission)/transaxle with 3.83:1 ratio.

Security is an ever increasing concern, with millions of cars being stolen a year. By combining the key and the standard electric car alarm button into one unit, and placing the ignition inside the engine, such as the receiver integrated circuit (IC) 34 (FIGS. 8 and 9) inside the oil cover 80, using only the key pad with a multi-million selection of radio codes to start the engine. When in the car, the key pad will be placed in a holding slot close to the driving position. It is cheaper, more secure, and easier to produce than current designs.

With reference to FIGS. 6 and 7, the coil shock absorbers 65 are attached to an upper suspension connection 69 supported in projecting mounting tabs molded into the universal engine mount/wing 17. Engine support spacers 16 can be variously shaped and mountable at different vertical positions on engine mount 17 to accommodate different sized engines. A flame shield 30 having a vertical wall 33 protects ABS body 7 from engine heat from engine 18. The rear upper and lower engineered ceramic wishbones 26 are attached to the universal engine mounts/wing 17 with aircraft aluminum rods 71 and nuts 72. Two drive shafts 70 (FIG. 7) with universal joints (not shown) are coupled from engine 18 to disc brake and hub assemblies 68. Hydraulic lines 62 (FIG. 3) are attached to the 15 cm solid disc brakes.

The rear combination light assemblies 20 are attached to rear bumper 19, and the rear bumper itself is glued to snap-in pins 38 (FIG. 11) of the universal engine mount/wing 17. The electrical harness 61 (FIG. 3) is connected to combination lights 20.

Turning to FIG. 5, the engineered ceramic rollbar 5 is fitted to a molded-in niche (not shown) and glued to the top of the chassis 24 to surround the passenger compartment around the cockpit. The curved 1 cm thick LEXAN (DuPont Co.) windshield 4 is glued in with windshield glazing. The ABS and ceramic door 2 is fitted in the molded-in door frame 86 (FIG. 3) which is a reinforced part of the chassis mold 24 and in the molded-in door frame 86' (FIG. 5) which is a formed part of the ABS outer body 7. A plastic and vinyl convertible top 64 may optionally be provided. Body supports are molded into the ABS body 7 to connect with the inner body chassis.

Figure 4:
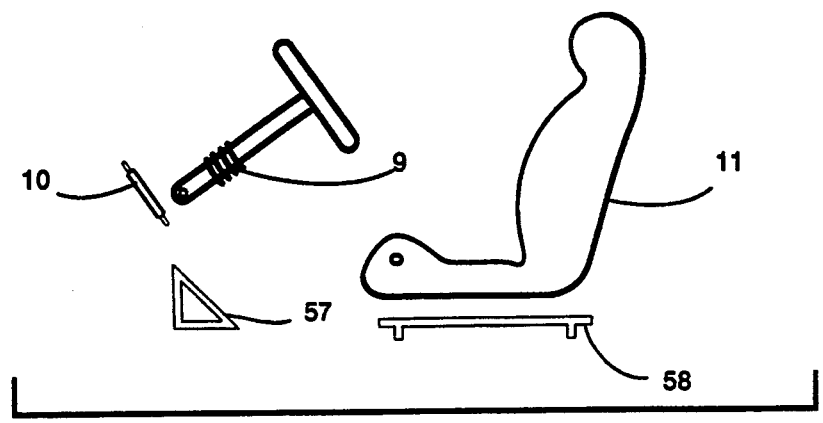
FIG. 4 schematically illustrates the relative placement of functional components contained within the cockpit module.
Figure 5:
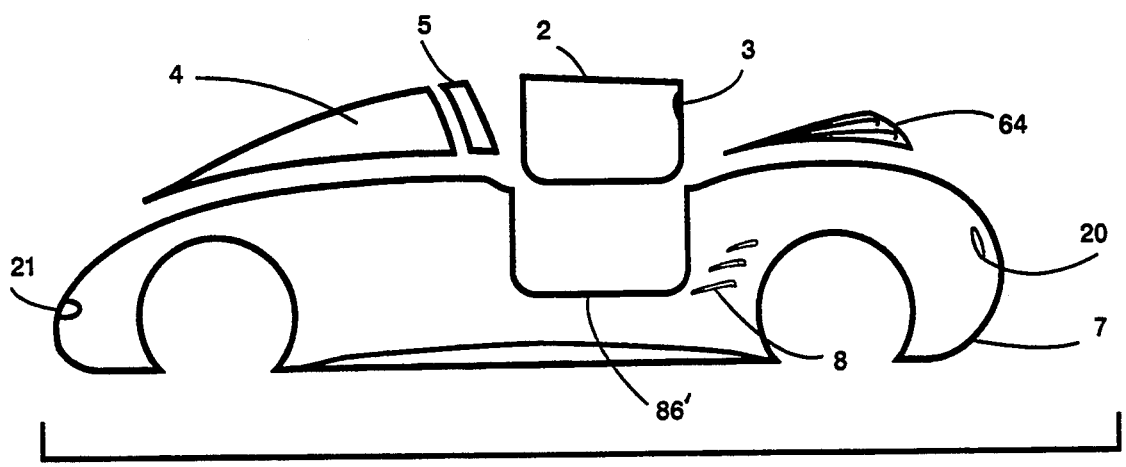
FIG. 5 is an exploded view of the components comprising the outer body.

With reference to the schematic representation of FIG. 4, a rack and pinion steering unit 10 is attached to a molded-in support on the forward bulkhead 14 of chassis 24. A plastic module 57 made of Cycolac incorporates two foot pedals for the throttle and brake functions and is snap-fitted and glued to the bulkhead 14. The brake (not shown) is connected to hydraulic lines 62 molded into the chassis 24. The pedal module 57 is a single mold of high-impact plastic with oversized brake and gas pedals.

Seat tracks 58, are snapped-fitted and glued through holes in the floor of the cockpit mold 27 to holes in chassis 24.

The steering wheel module 9 is passed through aperture 56 in forward body molding 12 and attached to rack and pinion 10. The steering wheel module 9 includes controls for controlling the electric servo operated reverse gear. Its electrical connections are plugged to electrical harness 61, molded into chassis 24. Included in the electronics in the steering wheel is a microelectronic chip that in addition to controlling display of the instrument readouts, automatically runs through a diagnostic check of all functions every time the engine is turned on. The steering wheel and its attachment apparatus are designed so the steering wheel can be moved to the right side for English and Japanese markets.

Figure 12:
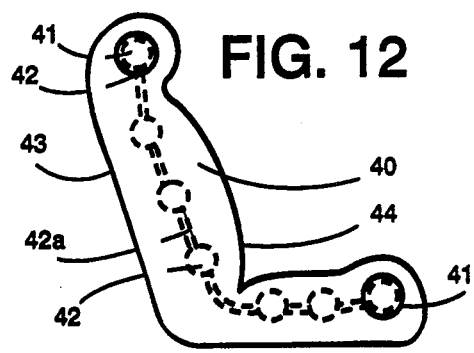
FIG. 12 is a side view of the seat assembly.
Figure 13:
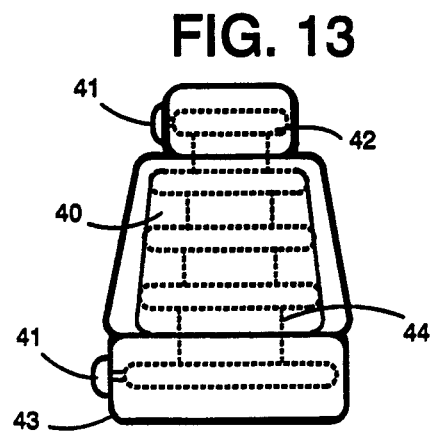
FIG. 13 is a front view of the seat assembly.

The two seat modules 11, referring to FIGS. 12 and 13, each comprises single Kevlar molds 43, with inner foam liner 40, under vinyl cover 44, and internal air cells 42, with Reebok-type air pumps 41, to adjust head, lower back and thigh support.

Figure 14:
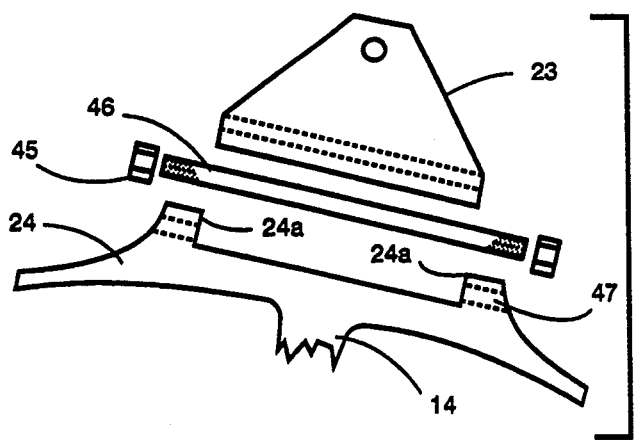
FIG. 14 is a top view of a front wheel suspension assembly.
Figure 15:
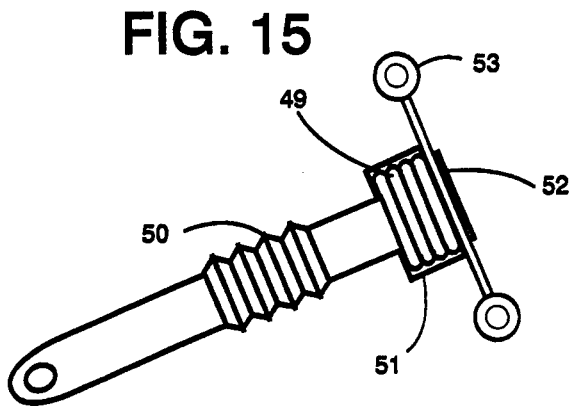
FIG. 15 is a side view of the steering column.
Figure 16:
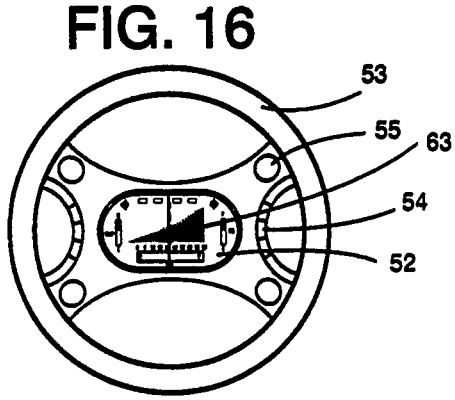
FIG. 16 is a front view of the steering column.

Referring to FIG. 14, the front engineered ceramic suspension wishbones 23, are bolted to attachment points 47, molded into ribs 24a projecting from the side of chassis 24, with aircraft aluminum rods 46 and nuts 45.

Coil spring/shocks 65 are fitted to the 6" solid disc brake pickup assembly 68. The brakes are connected to the hydraulic harness 62. The wheels are preferably 16×4.5 alloy wheels carrying low rolling resistance tires.

FIG. 17 shows an alternative body style wherein the engine is mounted in front of the passenger compartment. All reference numerals (numerical part) indicate like elements of the body style of FIG. 5. FIG. 18 shows the same elements as FIG. 4 except in reverse order for the front engine model of FIG. 17.

FIG. 19 shows a side elevation view of the inner chassis body 24 and motor mount 17 which would be substantially the same for either a front or rear engine model.

A technical data summary for the automobile made in accordance with the invention is as follows:

| TECH DATA (S series) | |
| --- | --- |
| Body style | 2-door, 2 passenger |
| Vehicle configuration | rear engine, rear drive |
| Engine configuration | inline 3, DOHC, 2 valve/cycle, air cooled |
| Engine displacement | 600 cc |
| HP @ rpm SAE net | 40 |
| Torque lb-ft @ rpm SAE net | 70 @ 4200 |
| Compression ratio | 9.2:1 |
| Transmission | CVT (continuously variable) |
| Axle ratio | 3.83:1 |
| DIMENSIONS | |
| Length (inches) | 155 |
| Width (inches) | 73 |
| Curb weight | 800 |
| Fuel capacity (gal.) | 6 |
| EPA city/hwy. mpg | 80/100 |
| CHASSIS | |
| Suspension F/R | upper/lower wishbone/independ |
| Steering | rack and pinion |
| Brakes F/R | 6" solid disk |
| Wheels | 16 × 4.5 inch alloy |
| Tires | low rolling resistance |
| MATERIALS | |
| Chassis | cold-molded organoceramic monocoque |
| Body | pulse polycarbonate ABS alloy or Thermoplastic Olefins (TPO) or Cycolac |
| Suspension wishbone | organoceramic or graphite composites |
| PRICE | |
| Base price | $5,500 |

The invention has been described with reference to the drawings representing a preferred embodiment of the invention. It is to be understood, however, that the preferred embodiment is merely exemplary and that many modifications of the various aspects of the invention can be made and still stay within the scope and spirit of the invention. Accordingly, the invention is only to be limited by the appended claims.

I claim:

1. An ultra safe, low cost, ultra-low emissions automobile providing high survivability in case of an accident, said automobile comprising:

a monocoque inner chassis body having a front and a rear;

a stylized outer body encasing said inner body;

means for attaching said outer body to said inner chassis body; and a combination rear wing and universal engine mount attached at the rear of said inner chassis body, said wing providing negative lift for said automobile while moving, cooling for an engine mounted on said engine mount, a flame shield between an engine mounted on said engine mount and said inner chassis body, and rear collision protection for said inner body, one of said inner chassis body and said wing/engine mount combination comprising a plurality of projecting pins, and the other of said inner chassis body and said wing/engine mount combination having mating holes for joining said inner chassis body and said wing/engine mount combination together.

2. The automobile as claimed in claim 1, wherein each said pin and mating hole combination is joined together by a fixative such as [Super Glue].

3. An ultra safe, low cost, ultra-low emissions automobile providing high survivability in case of an accident, said automobile comprising:

a cold molded engineered ceramic monocoque inner chassis body having a front and a rear;

a stylized outer body encasing said inner body;

means for attaching said outer body to said inner chassis body; and a combination rear wing and universal engine mount attached at the rear of said inner chassis body, said wing providing negative lift for said automobile while moving, cooling for an engine mounted on said engine mount, a flame shield between an engine mounted on said engine mount and said inner chassis body, and rear collision protection for said inner chassis body, one of said inner chassis body and said wing/engine mount combination comprising a plurality of projecting pins, and the other of said inner chassis body and said wing/engine mount combination having mating holes for joining said inner chassis body and said wing/engine mount combination together.

4. The automobile as claimed in claim 3, wherein each said pin and mating hole combination is joined together by a fixative such as [Super Glue].

* * * * *